United States Patent
Daultani et al.

(10) Patent No.: US 11,928,698 B2
(45) Date of Patent: Mar. 12, 2024

(54) INFORMATION PROCESSING APPARATUS, INFORMATION PROCESSING METHOD AND PROGRAM THEREOF

(71) Applicant: Rakuten Group, Inc., Tokyo (JP)

(72) Inventors: Dinesh Daultani, Tokyo (JP); Bruno Andre Charron, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 0 days.

(21) Appl. No.: 17/056,071

(22) PCT Filed: Jan. 20, 2020

(86) PCT No.: PCT/JP2020/001767
§ 371 (c)(1),
(2) Date: Nov. 17, 2020

(87) PCT Pub. No.: WO2021/149118
PCT Pub. Date: Jul. 29, 2021

(65) Prior Publication Data
US 2021/0406932 A1    Dec. 30, 2021

(51) Int. Cl.
*G06Q 30/0202* (2023.01)
*G06Q 40/04* (2012.01)

(52) U.S. Cl.
CPC ........ *G06Q 30/0202* (2013.01); *G06Q 40/04* (2013.01)

(58) Field of Classification Search
None
See application file for complete search history.

(56) References Cited

U.S. PATENT DOCUMENTS

| | | | | |
|---|---|---|---|---|
| 8,825,560 B2 * | 9/2014 | Hodjat | ................... | G06N 20/00 706/12 |
| 8,918,349 B2 * | 12/2014 | Hodjat | ................... | G06N 20/00 705/1.1 |

(Continued)

FOREIGN PATENT DOCUMENTS

| | | |
|---|---|---|
| JP | 2008-204103 A | 9/2008 |
| JP | 2012-525650 A | 10/2012 |

(Continued)

OTHER PUBLICATIONS

Hyejung Chung et al., "Genetic algorithm-optimized multi-channel convolutional neural network for stock market prediction", Neural Computing and Applications, vol. 32, No. 12,. 2019, pp. 7897-7914 (Year: 2019).*

(Continued)

*Primary Examiner* — Jamie H Austin
(74) *Attorney, Agent, or Firm* — Sughrue Mion, PLLC (57) ABSTRACT

An information processing apparatus having a first fitness calculation to calculate a fitness using a predetermined function for models in a population; a virtual model generating to select, as parent models, models having higher value of the fitness using the first fitness calculation among the models, and generate a virtual model that outputs by performing calculation of output results of the selected parent models; a second fitness calculation to calculate the fitness of the virtual model using the predetermined function; a replacing operation constituting the population by adding the virtual model and by deleting a model having lower value of the fitness among the models in the population; and a model extracting to extract a model having higher value of the fitness from the population by repeating processing by the virtual model generating, the second fitness calculation, (Continued)

and the model replacing until a predetermined termination condition is reached.

15 Claims, 6 Drawing Sheets

(56) References Cited

U.S. PATENT DOCUMENTS

| | | | | |
|---|---|---|---|---|
| 10,152,752 | B2* | 12/2018 | Johannes | G06Q 40/06 |
| 11,348,032 | B1* | 5/2022 | Van Gael | G06F 8/31 |
| 2003/0055614 | A1* | 3/2003 | Pelikan | G06N 3/126 |
| | | | | 703/2 |
| 2005/0005261 | A1* | 1/2005 | Severin | G06F 8/316 |
| | | | | 717/116 |
| 2009/0125370 | A1* | 5/2009 | Blondeau | G06N 3/126 |
| | | | | 706/12 |
| 2010/0274736 | A1* | 10/2010 | Hodjat | G06Q 40/06 |
| | | | | 705/36 R |
| 2010/0274742 | A1* | 10/2010 | Hodjat | G06N 20/00 |
| | | | | 706/13 |
| 2012/0239517 | A1* | 9/2012 | Blondeau | G06Q 10/0633 |
| | | | | 705/26.1 |
| 2013/0124440 | A1* | 5/2013 | Hodjat | G06N 3/126 |
| | | | | 706/13 |
| 2013/0254142 | A1* | 9/2013 | Hodjat | G06N 3/126 |
| | | | | 706/12 |
| 2014/0006316 | A1* | 1/2014 | Hodjat | G06N 3/12 |
| | | | | 706/13 |
| 2014/0229362 | A1* | 8/2014 | Hodjat | G06Q 40/06 |
| | | | | 705/37 |
| 2016/0283563 | A1* | 9/2016 | Hodjat | G06N 3/126 |
| 2018/0349930 | A1* | 12/2018 | Blomberg | G06Q 30/0202 |
| 2019/0108436 | A1* | 4/2019 | David | G06N 3/0454 |
| 2021/0027379 | A1* | 1/2021 | Zhu | G06N 3/0454 |
| 2021/0065294 | A1* | 3/2021 | Trevathan | H04L 63/102 |
| 2021/0406932 | A1* | 12/2021 | Daultani | G06Q 40/04 |

FOREIGN PATENT DOCUMENTS

| | | | |
|---|---|---|---|
| WO | 2006/085460 A1 | 8/2006 | |
| WO | 2010/127042 A1 | 11/2010 | |
| WO | WO-2011120200 A1 * | 10/2011 | G05B 13/04 |

OTHER PUBLICATIONS

Hyejung Chung et al., "Genetic algorithm-optimized multi-channel convolutional neural network for stock market prediction", Neural Computing and Applications, vol. 32, No. 12,. 2019, pp. 7897-7914 (Year: 2019) (Year: 2019).*

Communication dated Apr. 20, 2021, from the European Patent Office in European Application No. 20803073.4.

H Chung et al., "Genetic algorithm-optimized multi-channel convolutional neural network for stock market prediction", Neural Computing and Applications, vol. 32, No. 12, 2019, pp. 7897-7914 (18 Pages Total).

Wang Atouh, et al., "Foreign Exchange Trading Methodology based on Majority Strategy for Non-Inferiority Solution Set Acquired using Multi-Purpose GA", Information Processing Society of Japan Study Report, Mathematical Modeling and Problem Solution (MPS), 2016, pp. 1-9, vol. 2016-MPS-111, No. 26.

Suguru Tsujioka, et al., "A Study on Index which Evaluates Automatic Trading Rules", 7th Academic Conference on Artificial Intelligence, Session on Applications of Artificial Intelligence in Financial Industry (SIG-FIN), Feb. 21, 2013, pp. 26-30.

* cited by examiner

INFORMATION PROCESSING APPARATUS, INFORMATION PROCESSING METHOD AND PROGRAM THEREOF

CROSS REFERENCE TO RELATED APPLICATIONS

This application is a National Stage of International Application No. PCT/JP2020/001767 filed Jan. 20, 2020.

TECHNICAL FIELD

The present invention relates to an information processing apparatus, an information processing method and a program thereof, and more particularly, to a technique for automatically extracting a learning model for machine learning.

BACKGROUND ART

Machine learning models are applied to various financial instruments transactions, such as day-trading and other investments, and enable the forecasting and the like of a financial market trend through the machine learning.

Machine learning models of this type applied to the financial instruments transactions output a trading sign that indicates any one of buying ("Buy"), selling ("Sell") of a particular stock or the like, or doing nothing (No Action: "N/A") using, for example, an economic trend, an interest rate level, a foreign exchange, charts, or the like, as input data.

Currently, a large number of machine learning models exist to be applied to the financial instruments transactions such as the above mentioned investments, and the accuracy in prediction of financial market trends depends on which machine learning model is selected from among a large number of machine learning models.

Patent Literature 1 (International Publication of PCT International Application No. WO2006/085460 A) discloses an investment model managing method for allowing a user to select an investment model to be used for actual transactions from a plurality of investment models.

More particularly, in the investment model managing method of the Patent Literature 1, an investment model management server calculates the past and/or future hypothetical investment performance based on transaction data in the actual transaction market with respect to each of investment models registered in a database, displays the details and hypothetical investment performance (ranking information or the like) of each investment model on the user terminal from which an request is issued, and performs the necessary processing upon receipt of applications for an actual transaction from the user terminal using the investment model.

LISTING OF REFERENCES

Patent Literature

PATENT LITERATURE 1: International Publication of PCT International Application No. WO2006/085460 A

SUMMARY OF THE INVENTION

Problems to be Solved by the Invention

However, manually selecting a machine learning model with high prediction accuracy from among a large number of machine learning models requires a large amount of time and labor, and therefore lacks the practicality. On the other hand, selecting a machine learning model at random is likely to reduce prediction accuracy while reducing labor.

Further, it is technically possible to generate one machine learning model by fusing a plurality of machine learning models using so-called ensemble learning or the like. However, each of machine learning models has a different hyperparameter set, and when fusing different machine learning models, optimizing a combination of a large number of models composed of these different hyperparameter sets by a grid search requires an enormous amount of computation and is likely to occupy a large amount of computer resources for a long time.

In particular, in financial instruments transactions, a financial market fluctuates constantly from time to time, and the optimal solution for executing transactions also changes constantly from time to time. For example, the volume of transactions of exchange transactions to be performed on one day in the market may be, for example, tens-of-billion US dollars, and the frequency of updating the exchange rates may be very high, for example, 5 ms, resulting in updates of the rate up to several million times per day.

For this reason, the accuracy of market forecasts is likely to be reduced, unless the machine learning model changes in real time in response to these market fluctuations. As a result, it is required that the processing of automatically selecting the optimal machine learning model from a large number of machine learning models can be performed with a lower load at a higher speed.

The present invention has been made in order to solve the above mentioned problems and an object thereof is to provide an information processing apparatus, an information processing method and a program thereof that are capable of automatically extracting a learning model with higher accuracy from a large number of learning models at higher speed while reducing a load on computer resources.

Solution to Problems

In order to solve the above mentioned problems, according to one aspect of the present invention, there is provided an information processing apparatus, comprising: a first fitness calculation unit configured to calculate a fitness using a predetermined function for each of a plurality of models belonging to a population; a virtual model generating unit configured to select, as parent models, a plurality of models having higher value of the fitness calculated by the first fitness calculation unit among the plurality of models, and generate a virtual model that outputs an output result obtained by performing calculation of output results of the selected plurality of parent models; a second fitness calculation unit configured to calculate the fitness of the virtual model using the predetermined function; a model replacing unit configured to replace the models constituting the population by adding the virtual model to the population and by deleting a model having a lower value of the fitness from the population among the plurality of models belonging to the population; and a model extracting unit configured to extract a model having a higher value of the fitness from the population by repeating processing by the virtual model generating unit, the second fitness calculation unit, and the model replacing unit until a predetermined termination condition is reached.

The second fitness calculation unit may calculate the fitness of the virtual model by deriving a parameter to be substituted into the predetermined function from the output result of the virtual model and substituting the derived parameter into the predetermined function.

The virtual model generated by the virtual model generating unit may include information on an output result and a generation of each of the plurality of parent models.

The virtual model generating unit may constitute a subset of a plurality of models randomly selected from the plurality of models, and selects, as parent models, a plurality of models having a higher value of the fitness from the plurality of models belonging to the subset constituted.

The virtual model generating unit may not generate the virtual model when a number of the parent models referred to by the virtual model to be generated exceeds a predetermined threshold value.

The first fitness calculation unit and the second fitness calculation unit may calculate a utility value quantitatively indicating a utility of the model in a market as the fitness by substituting trading metrics of the model as a parameter into a utility function.

The trading metrics may include any one or more of a return, a winning rate, a Sharpe ratio, a trading frequency, and a winning rate difference between buying and selling in a transaction using the model.

The virtual model generated by the virtual model generating unit may output a trading sign obtained by calculating trading sign indicating an action of a transaction of the plurality of parent models.

The trading sign may indicate either buying, selling, or no-action (N/A).

The virtual model generating unit may generate the trading sign of the virtual model by assigning a predetermined score to each of trading signs output from the plurality of parent models and adding assigned scores.

The virtual model generating unit may generate the virtual model by crossing over the plurality of parent models using a genetic algorithm using each of the trading signs of the plurality of parent models as a gene.

The first fitness calculation unit and the second fitness calculation unit may calculate the fitness using a plurality of predetermined functions including combinations of different coefficients, and the model extracting unit may extract a model for each of the plurality of predetermined functions by repeating processing by the virtual model generating unit, the second fitness calculation unit, and the model replacing unit until a predetermined termination condition is reached for each of the plurality of predetermined functions.

The information processing apparatus may further comprise a display control unit configured to display and output a plurality of models extracted by the model extracting unit as candidate models and provide a user interface for accepting an input for selecting one or more models from the candidate models.

According to another aspect of the present invention, there is provided an information processing method executed by an information processing apparatus, comprising: a step of calculating a fitness using a predetermined function for each of a plurality of models belonging to a population; a step of selecting, as parent models, a plurality of models having a higher value of the fitness calculated among the plurality of models, and generating a virtual model that outputs an output result obtained by performing calculation of output results of the selected plurality of parent models; a step of calculating the fitness of the virtual model using the predetermined function; a step of replacing the models constituting the population by adding the virtual model to the population and by deleting a model having a lower value of the fitness from the population among the plurality of models belonging to the population; and a step of extracting a model having a higher value of the fitness from the population by repeating the step of generating the virtual model, the step of calculating the fitness of the virtual model, and the step of replacing the models until a predetermined termination condition is reached.

According to yet another aspect of the present invention, there is provided an information processing program for causing a computer to execute information processing, the program causing the computer to execute processing comprising: a first fitness calculating process for calculating a fitness using a predetermined function for each of a plurality of models belonging to a population; a virtual model generating process for selecting, as parent models, a plurality of models having higher value of the fitness calculated by the first fitness calculating process from the plurality of models, and generating a virtual model that outputs an output result obtained by performing calculation of output results of the selected plurality of parent models; a second fitness calculating process for calculating the fitness of the virtual model using the predetermined function; a model replacing process for replacing the models constituting the population by adding the virtual model to the population and by deleting a model having a lower value of the fitness from the population among the plurality of models belonging to the population; and a model extracting process for extracting a model having a higher value of the fitness from the population by repeating the virtual model generating process, the second fitness calculating process, and the model replacing process until a predetermined termination condition is reached.

ADVANTAGEOUS EFFECT OF THE INVENTION

According to the present invention, it makes it possible to automatically extract a learning model with higher accuracy from a large number of learning models at higher speed while reducing the load on computer resources.

The above mentioned and other not explicitly mentioned objects, aspects and advantages of the present invention will become apparent to those skilled in the art from the following embodiments (detailed description) of the invention by referring to the accompanying drawings and the appended claims.

DESCRIPTION OF EMBODIMENTS

Hereinafter, embodiments of the present invention will be described in detail with reference to the accompanying drawings. Among the constituent elements disclosed herein, those having the same function are denoted by the same reference numerals, and a description thereof is omitted. It should be noted that the embodiments disclosed herein are illustrative examples as means for implementing the present invention, and should be appropriately modified or changed depending on a configuration and various conditions of an apparatus to which the present invention is applied, and the present invention is not limited to the following embodiments. Furthermore, it should be noted that all of the combinations of features described in the following embodiments are not necessarily essential to the solution of the present invention.

Hereinafter, a non-limiting example will be described in which the learning model extraction apparatus serving as an information processing apparatus according to the present embodiment automatically extracts an optimal learned model from a plurality of learned models that output trading signs respectively indicating transaction actions with data relating to various financial instruments transactions such as securities, insurance, bonds, investment trusts, foreign exchange and the like as inputs. Nevertheless, the present embodiment is not limited thereto and can be applied to extraction of learned models for all application fields.

Hereinafter, a learned model for machine learning which is extracted by the learning model extraction apparatus according to the present embodiment may be simply referred to as a "model" or a "learning model".

The learning model extraction apparatus according to the present embodiment uses a genetic algorithm (GA) to cross over parent models to generate a virtual model, which has no entity (substance) as a learning model, and compares the fitness of a given model and the virtual model so as to extract a model that has a higher fitness from a large number of models. By operating in this way, the learning model extraction apparatus according to the present embodiment approximates the ensemble learning, which is a technique of generating one learning model by fusing a plurality of models, with a lower load.

According to the present embodiment, a utility function for quantitatively evaluating the usefulness or utility in financial instruments transactions is used as a fitness function for evaluating genes in the genetic algorithm. When the present embodiment is applied to an application field other than the financial instruments transactions as described above, similarly, a utility function including metrics of significance to be optimized may be used.

<Functional Configuration of Learning Model Extraction Apparatus>

Figure 1:
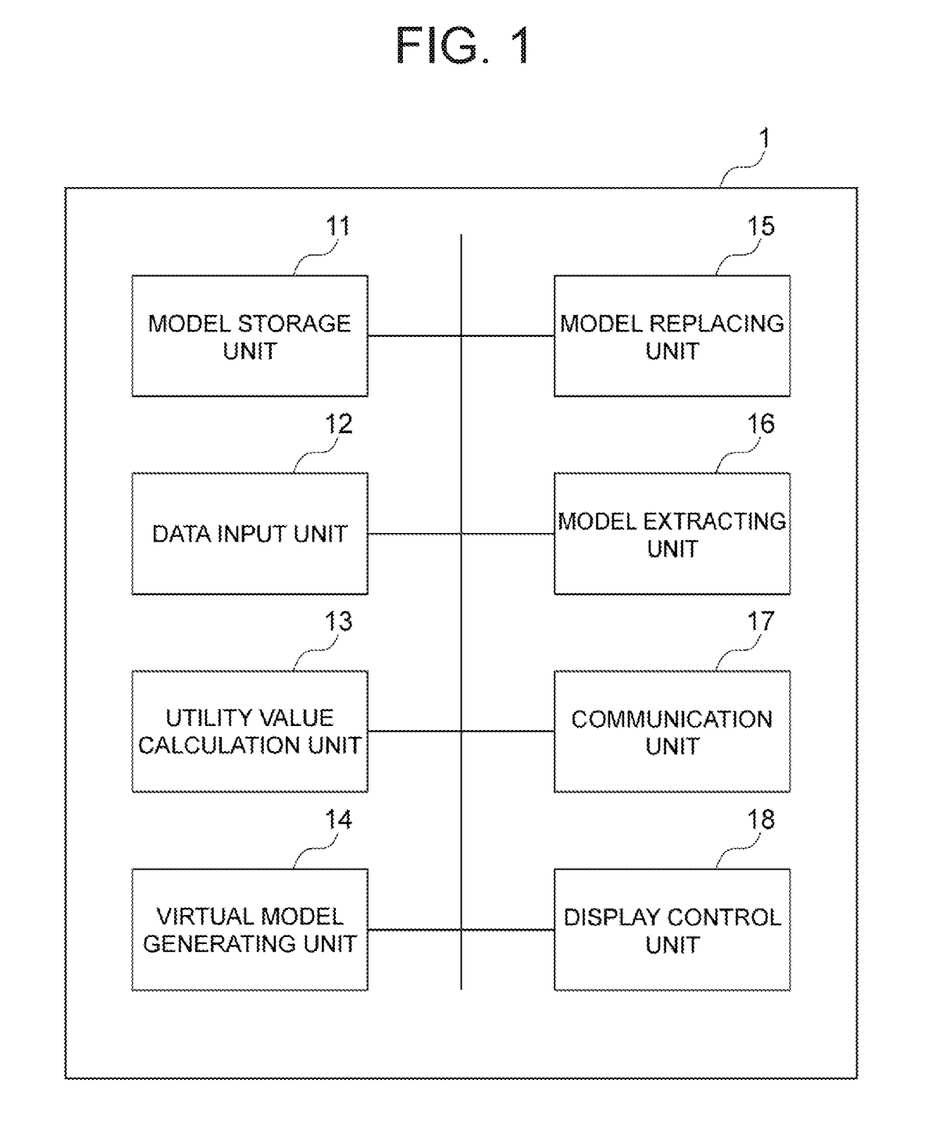
FIG. 1 is a block diagram showing an exemplary functional configuration of a learning model extraction apparatus according to an embodiment of the present invention.

FIG. 1 is a block diagram showing an exemplary functional configuration of a learning model extraction apparatus according to the present embodiment.

The learning model extraction apparatus 1 illustrated in FIG. 1 includes a model storage unit 11, a data input unit 12, a utility value calculating unit 13, a virtual model generating unit 14, a model replacing unit 15, a model extracting unit 16, a communication unit 17, and a display control unit 18.

The model storage unit 11 stores a plurality of learning models used in machine learning of financial instruments transactions.

The model storage unit 11 is configured in a storage device of the learning model extraction apparatus 1. The storage device may be configured with a volatile memory such as a Random Access Memory (RAM), a non-volatile memory such as a Read Only Memory (ROM), a Hard Disk Drive (HDD), a Solid State Drive (SSD), a removable external memory, or the like. The storage device is a storage area that can be shared and used by each of the components 11 to 17 in the learning model extraction apparatus 1 through a system bus, and may be used as a storage for various types of data or a work memory. It should be noted that the storage device may be provided inside the learning model extraction apparatus 1 or may be provided as an external device such as a server capable of communicating with the learning model extraction apparatus 1.

According to the present embodiment, the model storage unit 11 stores a large number of models for the machine learning. By way of a non-limiting example, the number of models stored in the model storage 11 is approximately 500 to 1000.

A model according to the present embodiment uses macroeconomic data, exchange data, and the like of a financial instrument transaction as input data, and infers a trading sign indicating an action of the transaction as an optimal solution to obtain output data.

More particularly, the input data into the model is data on economic trends, interest rate levels, foreign exchange, charts, or the like, and may include, for example, macroeconomic data (TOPIX index, Nikkei index, Japanese government bonds, crude oil prices), and exchange data (USD/JPY, EUR/USD, GBP/USD, CHF/USD, CAD/USD, AUD/USD, NZD/USD, CNY/USD, KRW/USD, or the like).

A trading sign, which is output data output from the model, indicates any one of transaction actions, for example, whether to buy ("Buy"), sell ("Sell"), or do nothing for (No Action: "N/A") financial instruments, such as stocks of a specified stock. The trading sign is used to trade various financial instruments such as stock futures, index futures (Nikkei (NK) 225, NY Dow (DJI) or the like), bond futures (Japanese Government Bond (JGB), US-dollar-denominated (USD) bonds or the like), and commodity futures.

The above described model is a learned model that is constructed and trained in advance by using past macroeconomic data and exchange data over a predetermined period of time (e.g., five years) as input data, performing the feature extraction by the feature engineering with data relating to the performance of financial transactions corresponding to the input being labelled for training, and applying a machine learning algorithm.

Data on the performance of financial transactions include, for example, data on the actual price fluctuations of financial instruments corresponding to input data (e.g., increases or decreases) and data on the correct answers of financial transactions corresponding to input data (e.g., data indicating a "Buy" for an increase in the price of a financial instrument).

The feature extraction can be performed, for example, by calculating a simple moving average or an exponentially weighted moving average for a predetermined period in the past, e.g., 180 days, with respect to daily input data.

Any machine learning algorithm can be applied to the models, such as any of Support Vector Machine (SVM), Convolutional Neural Network (CNN), Random Forests, and the like, or a combination thereof.

It should be noted that the present embodiment is directed to extracting an optimized model from a plurality of given learned models, and the construction of the learned model and the training itself will not be described in detail hereinafter.

The data input unit 12 receives input of a predetermined number of sample data used for calculating the utility value of each model stored in the model storage unit 11.

More particularly, the sample data input to the data input unit 12 is data for deriving a parameter value of a utility function for quantitatively calculating a performance or a utility in a financial instruments transaction of each model and calculating a utility value for quantitatively evaluating the utility of the model in a financial instruments transaction market. The sample data may include past macroeconomic data, exchange rate data, transaction results, in other words, transaction execution content and transaction execution result data for a predetermined period.

The data input unit 12 may store the input predetermined number of sample data in the storage device in advance, and the utility value calculation unit 13 may read the sample data stored in the storage device to derive the parameter value of the utility function.

Based on the sample data input to the data input unit 12 or stored in the storage device, the utility value calculation unit 13 derives parameter values of trading metrics, which are respective parameters of the utility function, and substitutes the derived parameter values of the trading metrics for the utility function so as to calculate a utility value. The utility value calculation unit 13 calculates a utility value by substituting the parameter value of each of the trading metrics of the utility function for each of the plurality of models stored in the model storage unit 11. Although the utility function has multiple trading metrics as the parameters, details of the utility function will be described below with reference to FIG. 2.

The virtual model generating unit 14 generates a virtual model from a plurality of models constituting a population stored in the model storage unit 11. More particularly, the virtual model generating unit 14 first uses the genetic algorithm to randomly select less number of models as a subset of the population from a plurality of models stored as the population in the model storage unit 11. The virtual model generating unit 14 then generates a virtual model, which is an offspring model, by using a plurality of models having higher utility values (for example, two models, hereinafter, an example in which two parent models are used will be described) among a plurality of models selected in the subset as a parent model and crossing over the parent models.

The virtual model generated by crossing over the parent models does not have an entity as a learning model, and is a virtual model having information indicating the parent models. The details of the process of generating the virtual model from the parent models will be described below with reference to FIGS. 2 and 3.

The utility value of the virtual model generated by the virtual model generating unit 14 is calculated by the utility value calculating unit 13 using the utility function.

The model replacing unit 15 updates the models included in the population by replacing a part of the models included in the population. More particularly, the model replacing unit 15 adds the virtual model generated by the virtual model generating unit 14 to the model population, and deletes a model having the lowest utility value from the population to which the virtual model has been added, thereby maintaining the number of models in the population at a predetermined number without increasing or decreasing the number of models in the population.

The model replacing unit 15 repeats the replacement process of models included in the population until a predetermined termination condition is reached.

After the model replacing unit 15 repeats the replacement of the models belonging to the population, the model extracting unit 16 extracts a model having the largest utility value among the models belonging to the population as an optimized model.

The model extracted by the model extracting unit 16 from among a large number of models is an optimized learned model. Input data such as macroeconomic data and exchange rate data at a time point to be predicted is then input to the extracted model so that future trading signs can be inferred and predicted with higher accuracy.

The communication unit 17 provides an interface with a network and performs communication with an external device through the network. Input data, sample data, transaction performance data and the like to be input to the model, for example, may be received from the external device through the communication unit 17, and trading signs as output results of the model, output results of the utility function, information of these histories and the like are transmitted. According to the present embodiment, the communication unit 17 may perform communication via a wired Local Area Network (LAN) conforming to a communication standard such as Ethernet (registered trademark) or a dedicated line network. However, the network that can be used in the present embodiment is not limited to those and may be configured by a wireless network. The wireless network may include a wireless Personal Area Network (PAN) such as Bluetooth (registered trademark), ZigBee (registered trademark), and Ultra Wide Band (UWB). It may also include a wireless LAN such as Wi-Fi (Wireless Fidelity (registered trademark)) and a wireless Metropolitan Area Network (MAN) such as WiMAX (registered trademark). In addition, it may include a wireless Wide Area Network (WAN) such as LTE/3G, 4G, and 5G. It should be noted that any kind of network may be used as long as it may connect respective devices to each other so as to be able to communicate, and the standard, scale, and configuration thereof is not limited to those described above.

The display control unit 18 displays and outputs the result of the learning model extraction process carried out by the learning model extraction apparatus 1 via a display device. The display control unit 18 may also provide a Graphical User Interface (GUI) for instructing and inputting, into the learning model extraction apparatus 1, various parameters used in the learning model extraction process, communication parameters used in the communication with other devices and the like.

It should be noted that the utility value calculating unit 13 corresponds to a first fitness calculation unit and a second fitness calculation unit in the appended claims, the virtual model generating unit 14 corresponds to a virtual model generating unit in the appended claims, the model replacing unit 15 corresponds to a model replacing unit in the appended claims, and the model extracting unit 16 corresponds to a model extracting unit in the appended claims.

<Applying Genetic Algorithm in Model Extraction>

A genetic algorithm is an optimization technique called evolutionary algorithm based on the theory of natural evolution and reflects the processes of natural selection in which the best individual for reproduction is selected to produce the next generation of offspring.

The genetic algorithm is an algorithm that searches for an optimal solution having a higher fitness from among a plurality of solution candidates.

According to the present embodiment, an optimized model is extracted by calculating output results of a plurality of parent models using the genetic algorithm to generate an offspring model, and evaluating the initial models and the offspring model with utility values using utility functions, respectively.

More particularly, according to the present embodiment, the learning model extraction apparatus 1 applies the genetic algorithm as follows.

An initial population to which the genetic algorithm is applied is constituted with all or a part of the individual models stored in the model storage unit 11. The trading signs, which are output from the individual model with respect to a given period of time, are assumed to be a gene.

The performance or utility of each of the models is evaluated using the above described utility function, of which details will be described below, as the fitness function for evaluating each of the genes in the genetic algorithm.

In a selection process, n-sample models are randomly selected as a subset of the population, and from the selected sample models, two sample models are determined as parent models that are evaluated by the utility function to have the highest utility values.

In a crossover process of the parent models, the trading signs output from the determined two parent models are combined with each other to generate a virtual model as an offspring model which outputs the combined trading signs. Details of the crossover process in the genetic algorithm according to the present embodiment will be described below with reference to FIG. 3.

It should be noted that, although examples in which mutation in the genetic algorithm does not apply to the present embodiment will be described, alternatively, the learning model extraction apparatus 1 of the present embodiment may apply the mutation to mutate a part of the trading signs in the offspring model.

<Detailed Processing Procedure of Learning Model Extraction Process>

Figure 2:
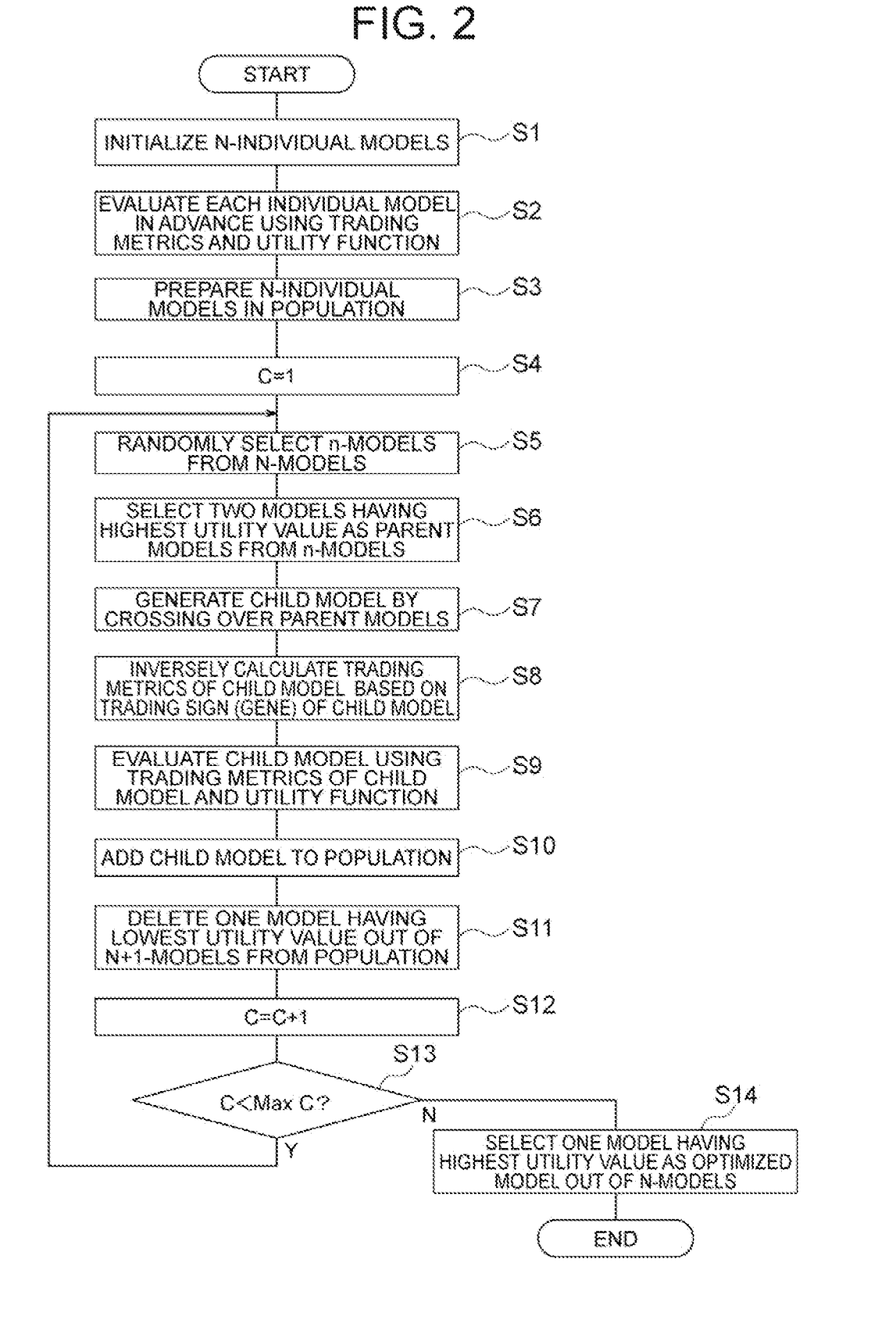
FIG. 2 is a flowchart showing an exemplary processing procedure of a learning model extraction process carried out by the learning model extraction apparatus according to the embodiment of the present invention.

FIG. 2 is a flowchart showing an exemplary processing procedure of a learning model extraction process carried out by the learning model extraction apparatus 1 according to the present embodiment.

Each step shown in FIG. 2 may be performed by the CPU reading and executing a program stored in the storage device of the learning model extraction apparatus 1. Alternatively, at least a part of the flowchart shown in FIG. 2 may be carried out by a hardware. When implemented by the hardware, for example, by using a predetermined compiler, a dedicated circuit may be automatically generated on a Field Programmable Gate Array (FPGA) from programs for implementing the respective steps. Furthermore, a gate array circuitry may be formed in the same manner as the FPGA and implemented as the hardware. Yet furthermore, it may be implemented by an Application Specific Integrated Circuit (ASIC).

In step S1, the utility value calculation unit 13 initializes all of the N-models stored in the model storage unit 11, respectively. By way of a non-limiting example, the number N of learned models initialized in S1 may be, for example, 432.

In step S2, the utility value calculation unit 13 evaluates each of the N-models initialized in step S1 using the utility function represented by the following equation 1.

$$\text{utility} = \alpha^* R + \beta^* WR + \gamma^* SR + \delta^* TF + \epsilon^* \Delta WR \quad \text{(Equation 1)}$$

In Equation 1 above, R denotes a normalized return, WR denotes a winning rate (%), SR denotes a Sharpe ratio, which is an indicator of a relation between return and risk, TF denotes a trading frequency (%), and AWR denotes the difference in the winning rates between "Buy" and "Sell", respectively. According to the present embodiment, the trading frequency means a frequency at which a "Buy" or "Sell" transaction is actually performed.

Those parameters R, WR, SR, TF, and ΔWR of the utility function are all trading metrics in financial instruments transactions, respectively. Also, $\alpha, \beta, \gamma, \delta$, and $\epsilon$ are arbitrary coefficients to be appropriately adjusted for different trading metrics, respectively. By way of a non-limiting example, each coefficient may be selected from $\alpha=[1,2]$, $\beta=[1,2,5]$, $\gamma=[1,5,10]$, $\delta[0]$, $\epsilon[1]$.

The utility value calculation unit 13 inputs the sample data, which is input to the data input unit 12, to each model, and calculates in advance the value of the trading metrics such as the return as described above with respect to each model. Then, the utility value calculation unit 13 calculates a utility value (in other words, usefulness value), which quantitatively indicates the performance or utility of the model in the financial instruments transaction in the predetermined period, by substituting the value of the trading metrics calculated in advance into the utility function expressed in the above Equation 1.

In step S3, the virtual model generating unit 14 prepares the N-individual models evaluated in step S2 in the population.

In step S4, the virtual model generating unit 14 and the model replacing unit 15 set a counter C of the number of generations to 1, and perform the processing from steps S5 to S12 based on the genetic algorithm in a first generation.

More particularly, in step S5, the virtual model generating unit 14 randomly selects n-individual models from the N-individual models prepared in the population as a subset of the population. By way of a non-limiting example, the number n of randomly selected individual models may be 20, or 40.

In step S6, the virtual model generating unit 14 selects two individual models having the largest utility value among the n-individual models selected in step S5 as parent models to be crossed over in the first generation. It should be noted that the number of individual models selected as the parent models in step S6 is not limited to 2 and may be 3 or more.

In step S7, the virtual model generating unit 14 crosses over the two parent models selected in step S6 to generate an offspring model. When the number of individual models selected as the parent model in step S6 is three or more, the virtual model generating unit 14 may cross over the selected number of parent models.

According to the present embodiment, the virtual model generating unit 14 generates, as the offspring model, a virtual model that does not have an entity (i.e., a set of parameters) as a learning model, by combining the trading signs output by the parent models.

According to the present embodiment, "crossover" refers to generating an offspring model from a predetermined number (e.g., two) of parent models. More particularly, according to the present embodiment, the virtual model generating unit 14 calculates an output result obtained by performing a predetermined combination operation with respect to output results of the parent models.

Then, the virtual model generating unit 14 inversely generates a virtual model for outputting the output result calculated by the combination operation as an output result to be output by the virtual model.

In other words, the virtual model is a virtual model that stores, as information indicating the parent models, an output result calculated by performing a combination operation of the output results of a predetermined number of parent models, or information on the output results of the parent models for calculating the output result obtained by performing the combination operation. The virtual model also stores information on the generation (lineage) of the parent models on which the output result is based, for example, in a tree structure.

Here, a model that outputs an output result as the basis of the combination is referred to as a parent model (i.e., ancestral model), and a model that outputs an output result obtained by performing a predetermined combination operation with respect to the output results of those parent models is referred to as a child model (i.e., offspring model).

Calculating the entity of the child model by fusing the entities of the parent models entails extremely high processing load, thus is difficult to implement with limited computer resources. For this reason, according to the present embodiment, the processing load is reduced by generating information indicating the parent models as the child model instead of calculating the entity of the child model. In other words, the child model according to the present embodiment is not a model with an entity, but a virtual model as information indicating the parent models that output the output results serving as a basis of a combination.

Since the virtual model, which is a child model, is not accompanied by an entity, the output result cannot be obtained by directly inputting the input data to the virtual model. Therefore, the learning model extraction apparatus 1 according to the present embodiment indirectly calculates the output result of the child model. More particularly, when the child model calculates an output result (output value) for a new input value, the output value for the input value is calculated from each of a plurality of parent models referred to by the child model, and the output value of the child model is then calculated by performing a combination operation with respect to the calculated output values.

Figure 3:
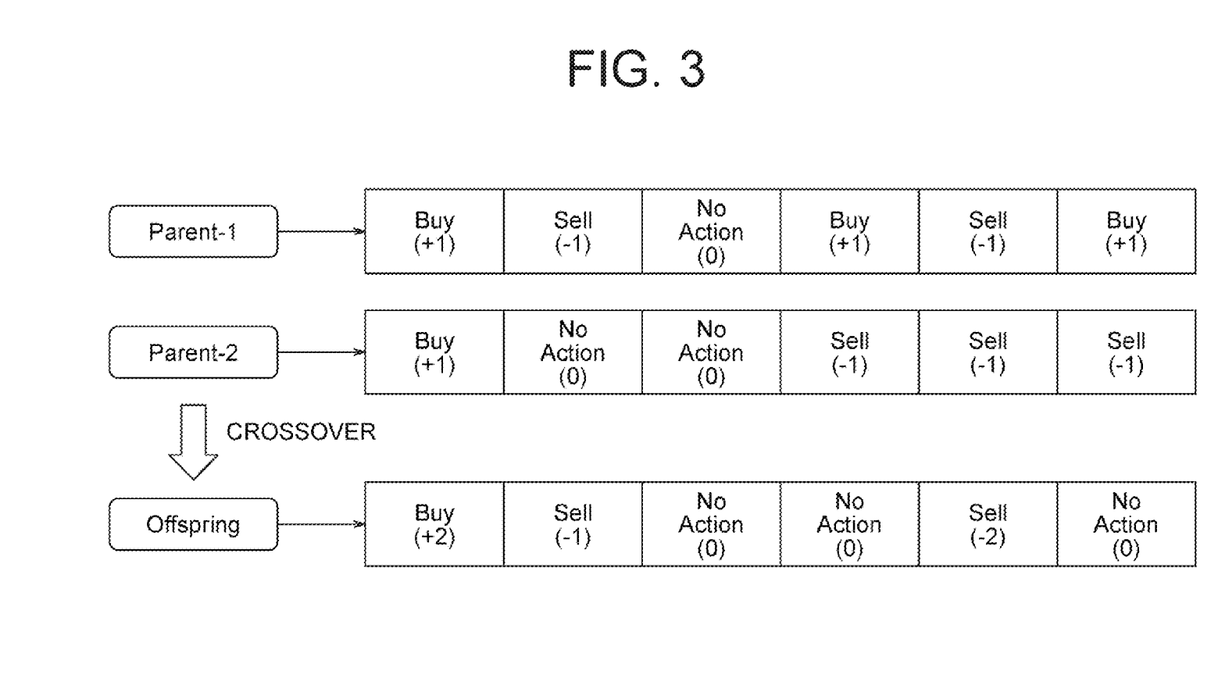
FIG. 3 is a schematic diagram illustrating an exemplary process of generating a virtual model which is a child model by crossing over two parent models.

FIG. 3 is a schematic diagram illustrating an exemplary processing of generating a virtual model which is a child model by crossing over two parent models.

The gene of each parent model are "Buy", "Sell", and "N/A" (no action), which are trading signs indicating the transaction actions that each parent model outputs over a predetermined time period (e.g., 365 days, 250 business days).

In an example shown in FIG. 3, it is assumed that a parent-1 model to be crossed over has previously output six trading signs of "Buy", "Sell", "N/A", "Buy", "Sell", and "Buy" as the trading signs serving as an output result. On the other hand, it is assumed that a parent-2 model to be crossed over has previously output six trading signs of "Buy", "N/A", "N/A", and "Sell", "Sell", "Sell" as the trading signs serving as an output result.

Those six trading signs are trading signs that are output from the parent-1 and parent-2 models at every predetermined interval, and the predetermined interval is set to an arbitrary interval, for example, several seconds, several minutes, several hours, several days, or the like. For example, the arbitrary interval may be set to, for example, four hours, according to the interval at which the transaction is performed, and the six trading signs may indicate trading signs for 24 hours. According to the present embodiment, a sequence of such trading signs output from the parent-1 and parent-2 models is used as the gene in the crossover. However, the number of trading signs output in the past predetermined period is not limited to six as illustrated in FIG. 3.

According to the present embodiment, the virtual model generating unit 14 assigns a score to each of those trading signs. Referring to FIG. 3, the virtual model generating unit 14 assigns a predetermined score of, for example, +1 point to "Buy", −1 point to "Sell", and 0 point to "N/A". Then, for each of the trading signs output from the parent-1 and the parent-2 models at the same timing, the sum of the assigned scores is calculated to generate a sequence of the trading signs of the child model. The virtual model generating unit 14 applies the majority voting theory, and generates "Buy" if the total score is +, "Sell" if the total score is −, and "N/A" if the total score is 0, as a trading sign which is a gene of the child model.

Referring to FIG. 3, since the child (offspring) model, in which parent-1 and parent-2 models are crossed over, has a sequence of +2, −1, 0, 0, −2, and 0 as the total scores of the trading signs, respectively, the child model is assumed to have a sequence of the trading signs of "Buy", "Sell", "N/A", "N/A", "Sell", and "N/A" as the gene of the child model.

It should be noted that the virtual model which is a child model does not necessarily have to retain the sequence itself of trading signs shown in FIG. 3. In this case, the virtual model which is the child model may retain information of the trading signs, which is the output result of each of the parent models (parent-1 and parent-2) to be crossed over, and information indicating the generation (lineage) of the parent models, and may dynamically derive (calculate) the trading signs of the child model by combining the trading signs, which are the output results of the parent-1 and parent-2 models.

Returning back to FIG. 2, in step S8, the virtual model generating unit 14 refers to the transaction performance in the target period corresponding to the past predetermined period in which the trading signs have been output, based on the trading signs which are the gene output by the virtual model serving as the child model generated in step S7, and inversely calculates the trading metrics of the child model (virtual model).

As described above, the trading signs, which are the gene of the child model, are treated as the trading signs output by the child model every predetermined interval in the past predetermined period.

According to the present embodiment, the trading metrics are calculated by confirming what transaction performance would have been obtained assuming the trading signs output by the child model being actually used in the past transaction.

Hereinafter, an example of a process of calculating a trading metrics will be described in detail with reference to FIG. 3.

In a case shown in FIG. 3, the virtual model, which is a child model, outputs six trading signs of "Buy", "Sell", "N/A", "N/A", "Sell", and "N/A" as the trading signs. As described above, the transaction frequency TF as a trading metric for the child model is the frequency with which buying or selling trades actually occur. Therefore, out of the six trading signs of the child model, the transaction corresponding to the trading signs of the three "N/A" (no action)

is not performed, so that the transaction frequency TF of the child model is calculated to be 50%.

Also, the return R is calculated as a total return obtained in a transaction using the trading signs output from the child model. As described above, there were no transactions corresponding to the three "N/A" trading signs of the child model, so that the return R corresponding to the three "N/A" trading signs becomes 0. On the other hand, the return R is calculated as the total return obtained from the transactions using the trading signs of "Buy" and "Sell", "Sell".

The winning rate WR is calculated as a winning rate for a transaction using the trading signs output from the child model. As described above, the "N/A" trading sign does not affect the winning rate WR because transactions corresponding to the three "N/A" trading signs of the child model are assumed not to have been performed. On the other hand, in a transaction using a trading signs of "Buy" and "Sell", "Sell", for example, assuming that there is a loss in a transaction corresponding to a trading sign of "Buy" and a profit is obtained in transactions corresponding to two "Sell" trading signs, the winning rate WR is calculated to be 66.7%.

The Sharpe ratio SR, and the difference in the winning rate ΔWR between buying and selling can also be similarly calculated based on the transaction performance that would have been obtained if the trading signs output from the child model had been actually used in past transactions. Nevertheless, the method of calculating the trading metrics from the trading signs is not limited to the above described example, and any other calculation method may be used.

Returning back to FIG. 2, in step S9, the utility value calculating unit 13 calculates a utility value for evaluating the child model by substituting the trading metrics of the child model, which has been inversely calculated in step S8, into the utility function as the parameters.

In step S10, the model replacing unit 15 adds, to the population prepared in step S2, the child model (virtual model) generated in step S7 and whose utility value is calculated using the utility function in step S9. In other words, in step S10, the population includes N+1-models including one child model.

In step S11, the model replacing unit 15 deletes one model having the lowest utility value out of N+1-models constituting the population. In other words, in step S11, the number of models belonging to the population returns to N.

In step S12, the model replacing unit 15 increments the counter C of the number of generations by 1.

In step S13, the model replacing unit 15 determines whether or not the counter C of the number of generations is smaller than MaxC of the maximum number of generations, which serves as a threshold value. By way of a non-limiting example, MaxC of the maximum number of generations is 5000.

When the counter C of the number of generations is smaller than the maximum number of generations MaxC (S13:Y), the processing returns to S5, and the processing from S5 to S12 are repeated for the next generation. In each generation, an offspring model (virtual model) is generated by crossover between parent models both having higher utility values and then added to the population. Nevertheless, the model replacing unit 15 maintains the number of models in the population at N, which is an initial value at step S3.

On the other hand, when the counter C of the number of generations reaches the maximum number of generations MaxC (S13:N), the processing proceeds to step S14.

In step S14, the model extracting unit 16 extracts, as the optimized model, one model having the highest utility value among the N models belonging to the population. The display control unit 18 may present the extracted model to a user via a display device. Then, the learning model extraction apparatus 1 terminates the processing.

It should be noted that, In step S14, an initial individual model having an entity as a learning model included in the population in step S3 and an offspring model (virtual model) generated by crossover between the parent models coexist in the population.

Here, when a model eventually selected as an optimized model having the highest utility value in step S14 is an offspring model serving as a virtual model, the virtual model has, as the gene, information for performing the combination operation of the output results (trading signs) of the parent models to output the output result (trading signs) of the virtual model, but does not have an entity as a learning model. For this reason, it is impossible for the virtual model to infer and predict the trading signs by directly inputting data such as macroeconomic data and exchange data to the virtual model.

For this reason, according to the present embodiment, the virtual model generating unit 14 stores, for example, in the above described model storage unit 11, information of at least output results (trading signs) of the ancestral models (i.e., parent models each having the entity as the initial individual model) which is the basis for generating the offspring model by crossover, in association with the virtual model (offspring model).

At the same time, the virtual model generating unit 14 stores, as information indicating which parent model has been added to crossing over for generating the offspring model (virtual model) in which generation, information of the generation (lineage) of the parent models described, for example, in a tree structure in the model storage unit 11 in association with the offspring model.

Figure 4:
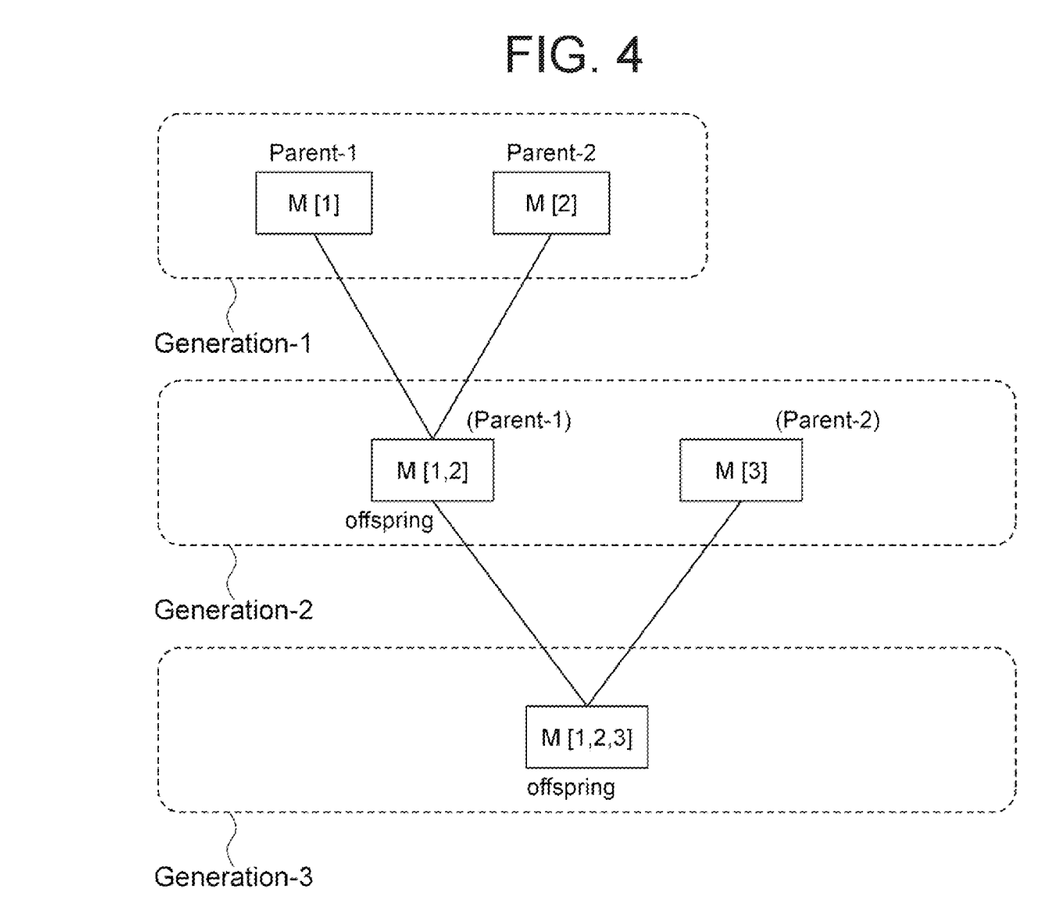
FIG. 4 is a schematic diagram illustrating exemplary information on a generation (lineage) of models having a tree structure.

FIG. 4 is a schematic diagram showing exemplary information of a generation (lineage) of models having such tree structure.

Referring to FIG. 4, it is assumed that a parent-1 model M[1] and a parent-2 model M[2] belong to a first generation (Generation-1), and an offspring model M[1, 2] of a second generation (Generation-2) is generated by crossing over the parent-1 model and the parent-2 model.

In addition, it is assumed that the offspring model M[1,2] of the second generation has been set to be the parent-1 model, and that an offspring model M[1,2,3] of a third generation (Generation-3) is generated by crossing over with the parent-2 model M[3].

In this case, the offspring model M[1, 2, 3] of the third generation retains information of the three parent models M[1], M[2], and M[3] each having the entity, together with information of the generation to which those parent models belong.

As a result, even in the offspring model (virtual model) obtained by repeating crossing over until reaching the maximum number of generation MaxC, it makes it possible to acquire trading sign information of the offspring model, which is the optimized model, by combining trading sign information of the ancestral models.

Furthermore, it is also possible to construct the entity of the offspring, which is the optimized model, to be directly made available as the learned model by fusing the entities of the ancestral models by tracing back the generation to a previous ancestral model that is the basis of the crossover for generating the offspring model, which is the optimized model extracted by the model extracting unit 16.

<Modification to Embodiments>

As a modification to the above described embodiments, the learning model extraction apparatus 1 may include a plurality of utility functions including combinations of different coefficients, select an optimized model for each of the plurality of utility functions, and present the selected plurality of models to a user.

Figure 5:
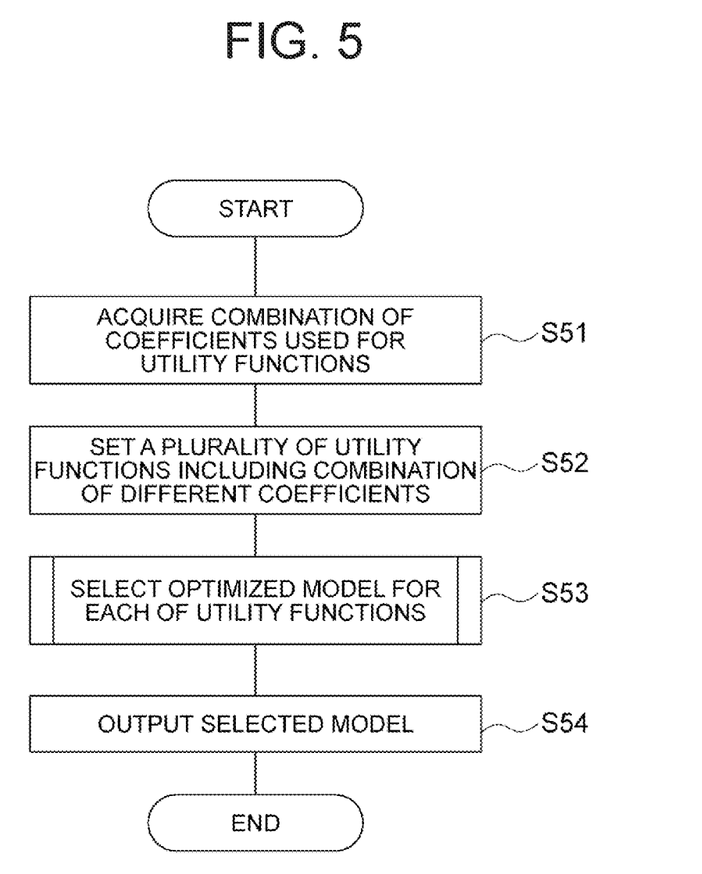
FIG. 5 is a flowchart showing an exemplary processing procedure of an extraction processing of a plurality of learning models carried out by a learning model extraction apparatus according to a modification to the embodiment of the present invention.

FIG. 5 is a flowchart showing an exemplary processing procedure of extraction processing of a plurality of learning models executed by the learning model extraction apparatus 1 according to the present modification.

Referring to FIG. 5, in step S51, the data input unit 12 acquires combinations of coefficients to be set for a plurality of utility functions, respectively. The combinations of the coefficients of the utility functions input to the data input unit 12 may be input by the user through a user interface or may be stored in advance in the storage device.

In step S52, the utility value calculation unit 13 sets a plurality of utility functions including combinations of the different coefficients acquired in step S51.

In step S53, the learning model extraction apparatus 1 performs the processing of steps S2 to S14 shown in FIG. 2 for each of the plurality of utility functions set in step S52. A group of individual models initialized in step S1 is common among a plurality of utility functions.

For example, it is assumed that the number of combinations of coefficients is four types as follows.

Type1: [α, β, ... ]=[1, 1, ... ]:Utility=1*R+1*WR+ ...
Type2: [α, β, ... ]=[1, 2, ... ]:Utility=1*R+2*WR+ ...
Type3: [α, β, ... ]=[2,1, ... ]:Utility=2*R+1*WR+ ...
Type4: [α, β, ... ]=[2,2, ... ]:Utility=2*R+2*WR+ ...

In this case, in step S2 shown in FIG. 2, evaluation of a common initial models starts for each of the utility functions of types 1 to 4.

Nevertheless, by calculating different utility values using utility functions of types 1 to 4 including combinations of different coefficients and performing random selection by the genetic algorithm, a plurality of models different for each utility function of types 1 to 4 can be eventually selected as an optimized model in step S14 shown in FIG. 2.

In step S54, therefore, the display control unit 18 displays and outputs a plurality of different optimized models as candidate models through the display device to present them to the user. Furthermore, the display control unit 18 provides the user with a GUI for accepting an input for selecting one or more models to be used from among the plurality of candidate models displayed and output. The display device may be equipped within the learning model extraction apparatus 1 itself, or otherwise may be equipped as an external device capable of communicating with the learning model extraction apparatus 1.

Accordingly, it makes it possible to allow the user to determine a model to be used in actual financial instruments transactions from among a plurality of candidate models narrowed down from among a large number of models. As a result, as compared with a case in which the user is required to manually select one model from a large number of models, it makes it possible to significantly reduce the user's load in connection with the model selection while leaving room for the user to select the model.

As another modification, a threshold may be set to the number of ancestral models that can be crossed over to generate a single virtual model.

More particularly, when the number of ancestral models referred to by the virtual model to be generated in step S7 exceeds the threshold value, the learning model extraction apparatus 1 may skip the processing of steps S7 to S11 shown in FIG. 2. In other words, in this case, the virtual model generating unit 14 does not generate a virtual model, and the model replacing unit 15 does not update the groups of models constituting the population, that is, does not replace the models included in the population.

As a result, it makes it possible to avoid an enormous computation amount for a virtual model having a large number of ancestor models in advance, thereby reducing the processing load in model extraction.

Furthermore, as yet another modification, the number of child models generated step in S7 is not limited to 1 and may be 2 or more. For example, if the number of individual models selected as the parent models in step S6 is three or more, two or more child models may be generated at a time from different combinations of parent models. In this case, the number of models deleted in step S11 may also be matched with the number of child models generated.

As a result, the child model can be efficiently generated, and even when the maximum generation number MaxC is set to a small value, it makes it possible to extract the optimized model from the initial individual models and a large number of offspring models.

<Hardware Configuration of Learning Model Extraction Apparatus 1>

Figure 6:
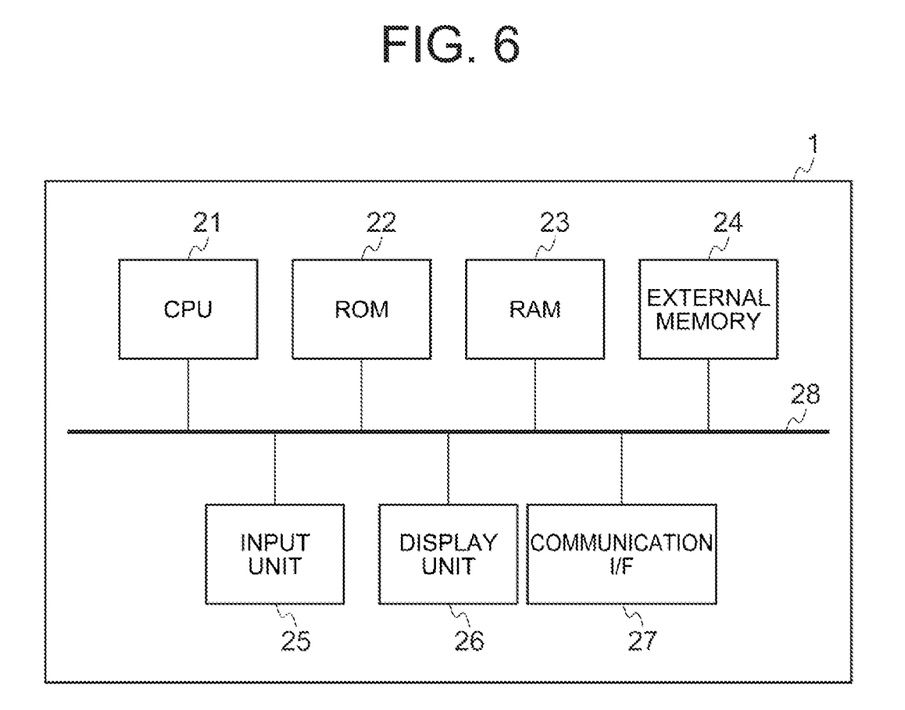
FIG. 6 is a diagram showing an exemplary hardware configuration of the learning model extraction apparatus according to the embodiment of the present invention.

FIG. 6 is a diagram showing an exemplary hardware configuration of the learning model extraction apparatus 1 according to the present embodiment.

The learning model extraction apparatus 1 according to the present embodiment can be implemented on any one or more computers, mobile devices, or any other processing platform.

As shown in FIG. 6, the learning model extraction apparatus 1 includes a CPU 21, a ROM 22, a RAM 23, an external memory 24, an input unit 25, a display unit 26, a communication I/F 27, and a system bus 28. The learning model extraction apparatus 1 may also incorporate an HDD.

The CPU 21 controls operations of the learning model extraction apparatus 1 in an integrated manner and controls the components (22 to 27) via a system bus 28 serving as a data transmission channel. The ROM 22 is a non-volatile memory that stores a control program or the like required for CPU21 to execute the processes. Instead, the program may be stored in the external memory 24 or a removable storage medium (not shown). The RAM 23 functions as a main memory or a work area or the like for the CPU 21. In other words, the CPU 21 loads a required program or the like from the ROM 22 into the RAM 23 at the time of executing the processes and executes the program or the like to realize various functional operations.

The HDD or the external memory 24 stores, for example, various data and various information required when the CPU 21 performs a process using a program. Furthermore, the HDD or the external memory 24 stores, for example, various data and various information obtained by the CPU 21 performing a process using a program or the like. The input unit 25 is constituted with a keyboard or a pointing device such as a mouse. The display unit 26 serving as a display device is constituted with a monitor such as a liquid crystal display (LCD). The communication I/F 27 is an interface for controlling communication between the learning model extraction apparatus 1 and an external device.

Functions of at least some of the elements of the learning model extraction apparatus 1 shown in FIG. 1 can be realized by the CPU 21 executing programs. Nevertheless, at least a part of the functions of the elements of the learning model extraction apparatus 1 shown in FIG. 2 may operate as a dedicated hardware. In this case, the dedicated hardware operates based on the control of the CPU 21.

As described above, according to the present embodiment, the learning model extraction apparatus calculates a utility value using a utility function for each of a plurality of models belonging to a population, selects, as parent models, a plurality of models having higher calculated utility values, generates a virtual model for outputting an output result obtained by calculating output results of the selected plurality of parent models, and calculates a utility value of the virtual model using the utility function.

Furthermore, the learning model extraction apparatus adds the virtual model to the population and deletes, from the population, a model having a lower utility value from the plurality of models belonging to the population, thereby replacing models constituting the population, repeating processing of the virtual model generation, the utility value calculation, and the model replacement until a predetermined termination condition is reached, so as to extract a model having the highest utility value from the population.

As a result, according to the present embodiment, it makes it possible to automatically extract, from a large number of learning models, a learning model with higher accuracy at high speed while reducing the processing load on the computer resources so as to achieve a high precision inferencing with the optimized learning model.

Although specific embodiments have been described above, the embodiments described are illustrative only and are not intended to limit the scope of the present invention. The apparatus and method described herein may be embodied in other forms than as described above. In addition, it is also possible to appropriately omit, substitute, or modify the above described embodiments without departing from the scope of the present invention. Embodiments with such omissions, substitutions and modifications fall within the scope of the appended claims and equivalents thereof and also fall within the technical scope of the present invention.

REFERENCE SIGNS LIST

1: Learning Model Extraction Apparatus, 11: Model Storage Unit, 12: Data Input Unit, 13: Utility Value Calculation Unit, 14: Virtual Model Generating Unit, 15: Model Replacing Unit, 16: Model Extracting Unit, 17: Communication Unit, 21: CPU, 22: ROM, 23: RAM, 24: External Memory, 25: Input Unit, 26: Display Unit, 27: Communication I/F

What is claimed is:

1. An information processing apparatus configured to automatically conduct machine learning operations to improve a plurality of machine learning models by analyzing and replacing machine learning models in the plurality of machine learning models and extract an optimized model of the machine learning operations with a lower load at a higher speed, comprising:
at least one memory configured to store program code; and
electronic circuitry including at least one of an Application Specific Integrated Circuit (ASIC), Field Programmable Gate Array (FGPA), and processor, the processor being configured to operate as instructed by the program code, the electronic circuitry configured to:
calculate a fitness using a predetermined function for each of a plurality of machine learning models belonging to a population, the fitness being based on a utility value quantitatively indicating a model utility by substituting at least one model metric as a parameter into a utility function;
select, as parent models, a plurality of models from the population having higher value of the fitness calculated among the plurality of models in the population;
generate a virtual model that outputs an output result obtained by performing calculation of output results of the selected plurality of parent models and has information indicating the selected plurality of parent models that output the output results serving as a basis of the calculation, wherein the virtual model does not have an entity as a learning model and includes information on an output result of each of the plurality of parent models and a generation of each of the plurality of parent models;
store the information of the output results of the plurality of parent models in a memory in association with the generated virtual model and the information of the generation of the plurality of parent models in association with the virtual model;
calculate the fitness of the virtual model using the predetermined function;
perform a replacing operation to update the population by adding the virtual model to the population and by deleting a model among the plurality of models in the population having a lowest value of the fitness from the population;
repeat selecting of the parent models from the updated population, generating of the virtual model, storing of the information in association with the virtual model, calculating the fitness of the virtual model, and performing the replacing operation until a predetermined termination condition is reached; and
automatically extract, a model having a higher value of the fitness from the updated population when the predetermined termination condition is reached, thereby extracting the optimized model of the machine learning operations for the predetermined function with a lower load at a higher speed by using the virtual model that does not have an entity as a learning model.

2. The information processing apparatus according to claim 1, wherein the electronic circuitry is further configured to:
calculate the fitness of the virtual model by deriving a parameter to be substituted into the predetermined function from the output result of the virtual model and substituting the derived parameter into the predetermined function.

3. The information processing apparatus according to claim 1, wherein
the virtual model generated includes information on an output result and a generation of each of the plurality of parent models.

4. The information processing apparatus according to claim 1, wherein
the virtual model generating constitutes a subset of a plurality of machine learning models randomly selected from the plurality of machine learning models, and selects, as parent models, a plurality of machine learning models having a higher value of the fitness from the plurality of machine learning models belonging to the subset constituted.

5. The information processing apparatus according to claim 1, wherein
the virtual model generating does not generate the virtual model when a number of the parent models referred to by the virtual model to be generated exceeds a predetermined threshold value.

6. The information processing apparatus according to claim 1, wherein
the utility value quantitatively indicates a model utility in a market as the fitness by substituting at least one model trading metric as a parameter into the utility function.

7. The information processing apparatus according to claim 6, wherein
the at least one mode trading metric includes any one or more of a return, a winning rate, a Sharpe ratio, a trading frequency, and a winning rate difference between buying and selling in a transaction.

8. The information processing apparatus according to claim 1, wherein
the virtual model generated outputs a trading sign obtained by combining trading signs of the plurality of parent models.

9. The information processing apparatus according to claim 8, wherein the trading sign indicates either buying, selling, or no-action (N/A).

10. The information processing apparatus according to claim 8, wherein
the virtual model generating generates the trading sign of the virtual model by assigning a predetermined score to each of trading signs output from the plurality of parent models and adding assigned scores.

11. The information processing apparatus according to claim 8, wherein
the virtual model generating generates the virtual model by crossing over the plurality of parent models using a genetic algorithm using each of the trading signs of the plurality of parent models as a gene.

12. The information processing apparatus according to claim 1, wherein the electronic circuitry is further configured to:
calculate the fitness using a plurality of predetermined functions including combinations of different coefficients, and
the model extracting extracts the extracted model for each of the plurality of predetermined functions by repeating processing of the virtual model until a predetermined termination condition is reached for each of the plurality of predetermined functions.

13. The information processing apparatus according to claim 12, further comprising:
a display control unit configured to display and output a plurality of extracted models as candidate models and provide a user interface for accepting an input for selecting one or more candidate models.

14. An information processing method executed by an information processing apparatus to automatically conduct machine learning operations to analyze and improve machine learning models, and extract an optimized model of the machine learning operations with a lower load at a higher speed, comprising:
calculating a fitness using a predetermined function for each of a plurality of machine learning models belonging to a population, the fitness being based on a utility value quantitatively indicating a model utility by substituting at least one model metric as a parameter into a utility function;
selecting, as parent models, a plurality of models from the population having a higher value of the fitness calculated among the plurality of models in the population;
generating a virtual model that outputs an output result obtained by performing calculation of output results of the selected plurality of parent models and has information indicating the selected plurality of parent models that output the output results serving as a basis of the calculation, wherein the virtual model does not have an entity as a learning model and includes information on an output result of each of the plurality of parent models and a generation of each of the plurality of parent models;
storing the information of the output results of the plurality of parent models in a memory in association with the generated virtual model and the information of the generation of the plurality of parent models in association with the virtual model;
calculating the fitness of the virtual model using the predetermined function;
performing a replacing operation to update the population by adding the virtual model to the population and by deleting a model among the plurality of models in the population having a lowest value of the fitness from the population;
repeat selecting of the parent models from the updated population, generating of the virtual model, storing of the information in association with the virtual model, calculating the fitness of the virtual model, and performing the replacing operation until a predetermined termination condition is reached; and
automatically extracting, a model having a higher value of the fitness from the updated population when the predetermined termination condition is reached, thereby extracting the optimized model of the machine learning operations for the predetermined function with a lower load at a higher speed by using the virtual model that does not have an entity as a learning model.

15. A non-transitory computer readable medium having a computer program stored thereon, the computer program configured to cause a computer to automatically conduct machine learning operations to analyze and improve machine learning models, and extract an optimized model of the machine learning operations with a lower load at a higher speed, comprising:
a first fitness calculating process for calculating a fitness using a predetermined function for each of a plurality of machine learning models belonging to a population, the fitness being based on a utility value quantitatively indicating a model utility by substituting at least one model metric as a parameter into a utility function;
a virtual model generating process for:
selecting, as parent models, a plurality of models from the population having higher value of the fitness calculated by the first fitness calculating process from the plurality of models; and
generating a virtual model that outputs an output result obtained by performing calculation of output results of the selected plurality of parent models and has information indicating the selected plurality of parent models that output the output results serving as a basis of the calculation, wherein the virtual model does not have an entity as a learning model and includes information on an output result of each of the plurality of parent models and a generation of each of the plurality of parent models;
a storing process for storing the information of the output results of the plurality of parent models in a memory in association with the generated virtual model and the information of the generation of the plurality of parent models in association with the virtual model;
a second fitness calculating process for calculating the fitness of the virtual model using the predetermined function;

a replacing process for updating the population that adds the virtual model to the population and deletes a model among the plurality of models in the population having a lowest value of the fitness from the population;

a repeating process for repeating the virtual module generating process, the storing process, the second fitness calculating process, and the replacing process until a predetermined termination condition is reached; and a model extracting process for automatically extracting, a model having a higher value of the fitness from the updated population when the predetermined termination condition is reached, thereby extracting the optimized model of the machine learning operations for the predetermined function with a lower load at a higher speed by using the virtual model that does not have an entity as a learning model.

* * * * *